US012792206B2

(12) United States Patent
Wang

(10) Patent No.: US 12,792,206 B2
(45) Date of Patent: Nov. 10, 2026

(54) SCREEN ROTATION CONTROL METHOD AND APPARATUS, AND ELECTRONIC DEVICE

(71) Applicant: HUAWEI TECHNOLOGIES CO., LTD., Shenzhen (CN)

(72) Inventor: Bo Wang, Wuhan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 168 days.

(21) Appl. No.: 18/402,391

(22) Filed: Jan. 2, 2024

(65) Prior Publication Data

US 2024/0211122 A1 Jun. 27, 2024

Related U.S. Application Data

(63) Continuation of application No. PCT/CN2022/100825, filed on Jun. 23, 2022.

(30) Foreign Application Priority Data

Jul. 5, 2021 (CN) ........................ 202110758909.3

(51) Int. Cl.
*G06F 3/04845* (2022.01)
*G06F 9/451* (2018.01)

(52) U.S. Cl.
CPC .......... *G06F 3/04845* (2013.01); *G06F 9/451* (2018.02)

(58) Field of Classification Search
CPC .... G06F 3/04845; G06F 9/451; G06F 1/1626; G06F 3/0481; G06F 2200/1637; G06F 3/0487; G06F 1/1694; G06F 3/0484
See application file for complete search history.

(56) References Cited

U.S. PATENT DOCUMENTS

2009/0191854 A1* 7/2009 Beason ............. H04M 1/72448 455/418
2010/0088532 A1 4/2010 Pollock et al.
(Continued)

FOREIGN PATENT DOCUMENTS

CN 103370681 A 10/2013
CN 105359085 A 2/2016
(Continued)

OTHER PUBLICATIONS

"How to lock the direction of Tencent Video," Blue Star Arc, Baidu Experience, https://jingyan.baidu.com/article/3065b3b6e178d1ffcef8a458.html, total 11 pages (Feb. 19, 2021). With an English Translation.

*Primary Examiner* — Daniel W Parcher
(74) *Attorney, Agent, or Firm* — Leydig, Voit & Mayer, Ltd.

(57) ABSTRACT

A screen rotation control method is provided. The method may include: displaying a first interface of a first application on a display of an electronic device, wherein a window direction of the first interface is the same as a holding direction of the electronic device; and when detecting an operation of opening a second interface of a second application by using the first interface, and determining that a preset window direction of the second interface is different from the holding direction of the electronic device, displaying an interface of a first target application in the preset window direction of the second interface, and keeping a window direction of a second target application unchanged, wherein the first target application includes the second application, and the second target application includes the first application.

7 Claims, 12 Drawing Sheets

(56) References Cited

U.S. PATENT DOCUMENTS

| | | | | | |
|---|---|---|---|---|---|
| 2012/0297400 | A1* | 11/2012 | Hill | G06F 9/445 719/318 |
| 2013/0004138 | A1* | 1/2013 | Kilar | H04N 21/8455 386/230 |
| 2013/0162684 | A1 | 6/2013 | Williams | |
| 2014/0165006 | A1* | 6/2014 | Chaudhri | H04N 7/15 715/835 |
| 2015/0074589 | A1 | 3/2015 | Pan et al. | |
| 2016/0209994 | A1* | 7/2016 | Kaufthal | G06F 9/45512 |
| 2017/0139576 | A1* | 5/2017 | Jeong | G06F 3/0346 |
| 2018/0011630 | A1* | 1/2018 | Kim | G06F 1/1626 |
| 2018/0196529 | A1* | 7/2018 | Shaffer | G06F 3/0482 |
| 2020/0310627 | A1* | 10/2020 | Ning | G06F 3/04817 |
| 2020/0380935 | A1* | 12/2020 | Ignaszewski | G06F 1/1622 |
| 2021/0157970 | A1* | 5/2021 | Behar | G06F 40/103 |
| 2022/0326816 | A1* | 10/2022 | Walkin | G06F 3/04883 |

FOREIGN PATENT DOCUMENTS

| | | | |
|---|---|---|---|
| CN | 105915705 | A | 8/2016 |
| CN | 108260018 | A | 7/2018 |
| CN | 109814766 | A | 5/2019 |
| CN | 110134475 | A | 8/2019 |
| CN | 110290269 | A | 9/2019 |
| CN | 112130742 | A | 12/2020 |
| CN | 112948037 | A | 6/2021 |

* cited by examiner

CONT.
FROM
FIG. 1B
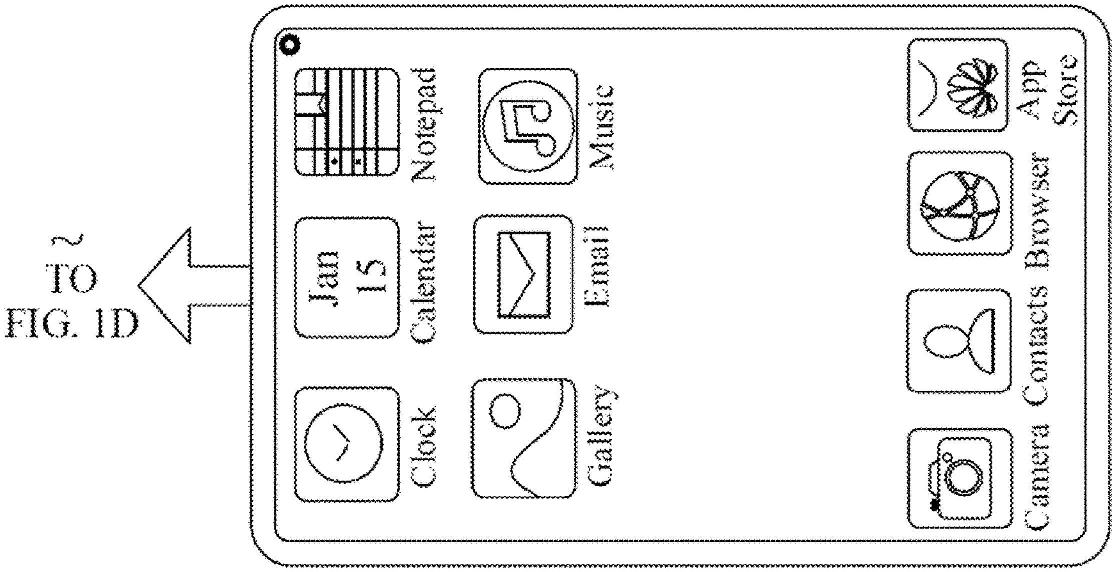
FIG. 1C
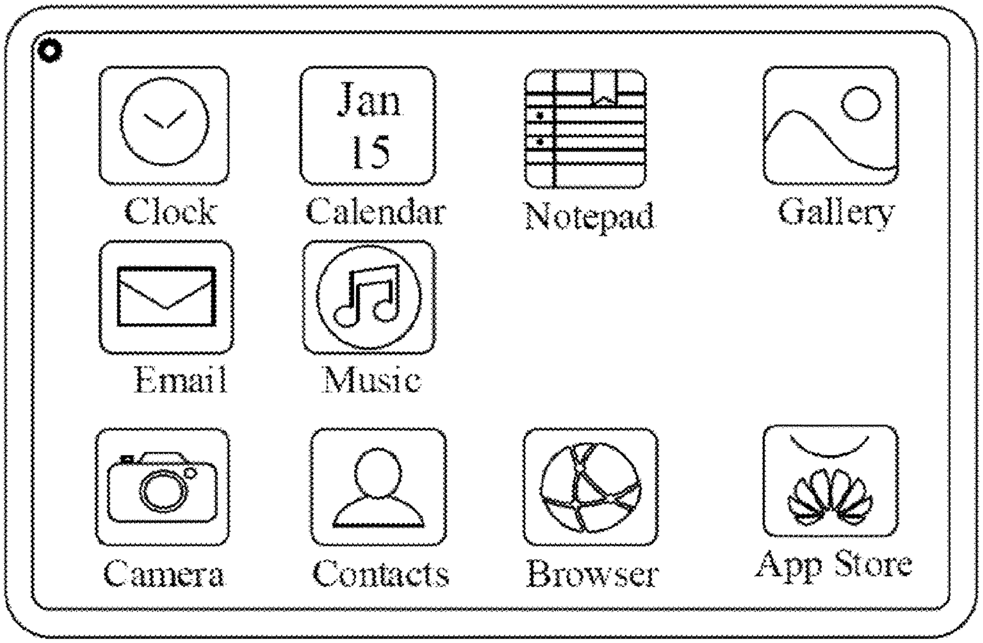
CONT
FROM
FIG. 1C
FIG. 1D

SCREEN ROTATION CONTROL METHOD AND APPARATUS, AND ELECTRONIC DEVICE

CROSS-REFERENCE TO RELATED APPLICATIONS

This application is a continuation of International Application No. PCT/CN2022/100825, filed on Jun. 23, 2022, which claims priority to Chinese Patent Application No. 202110758909.3, filed on Jul. 5, 2021. The disclosures of the aforementioned applications are hereby incorporated by reference in their entireties.

TECHNICAL FIELD

Embodiments of the present application relate to the field of communications technologies, and in particular, to a screen rotation control method and apparatus, and an electronic device.

BACKGROUND

Application display technologies are increasingly and widely used on terminal devices. Display directions on a terminal device may be classified into four directions: landscape, portrait, reverse landscape, and reverse portrait. Not all windows of all applications can support displaying in all directions. For example, some applications support displaying only in the portrait direction. Even if the device switches to the landscape direction, the applications are still displayed in the portrait direction.

SUMMARY

Embodiments of this application provide a screen rotation control method and apparatus, and an electronic device, to implement differentiated management on a screen rotation status of a foreground display application and a screen rotation status of a background application based on a physical holding status of a current device, so that when a top-layer application returns, a next to-be-displayed application is already in a final display status, thereby improving experience of scenario switching.

According to a first aspect, an embodiment of this application provides a screen rotation control method, which may be applied to an electronic device having a display. The method includes: displaying a first interface of a first application, where a window direction of the first interface is the same as a holding direction of the electronic device; and when detecting an operation of opening a second interface of a second application by using the first interface, and determining that a preset window direction of the second interface is different from the holding direction of the electronic device, displaying an interface of a first target application in the preset window direction of the second interface, and keeping a window direction of a second target application unchanged, where the first target application includes the second application, and the second target application includes the first application.

In other words, the screen rotation method provided in this embodiment of this application is mainly for switching between display interfaces of different applications. When a screen rotation operation is performed, screen rotation processing is performed only on an application that currently needs to be rotated, and screen rotation processing is not performed on another application, so that when a user closes a top-layer window, a next window that needs to be displayed is already in a final display status, thereby ensuring an experience effect during window switching.

In a possible implementation, after the displaying an interface of a first target application in the preset window direction of the second interface, and keeping a window direction of a second target application unchanged, the method further includes: when detecting that the holding direction of the electronic device changes, determining whether a window display direction of the first target application is the same as a current holding direction of the electronic device; and based on that the window display direction of the first target application is the same as the current holding direction of the electronic device, updating a window direction of an application other than the first target application on the electronic device, so that the window direction of the application other than the first target application is the same as the current holding direction of the electronic device; or based on that the window display direction of the first target application is different from the current holding direction of the electronic device, updating a window direction of each application on the electronic device, so that the window direction of each application on the electronic device is the same as the current holding direction of the electronic device.

In other words, after the user changes the holding direction of the electronic device, it is determined whether a window direction of a foreground display application is the same as the current holding direction of the electronic device, and when the window direction of the foreground display application is the same as the current holding direction of the electronic device, a screen rotation operation needs to be performed only on an application other than the foreground display application.

In a possible implementation, when detecting an operation of opening a second interface of a second application by using the first interface, and determining that a preset window direction of the second interface is different from the holding direction of the electronic device, the displaying an interface of a first target application in the preset window direction of the second interface, and keeping a window direction of a second target application unchanged includes: obtaining the preset window direction of the second interface of the second application by using an activity manager, and when the preset window direction is different from the holding direction of the electronic device, triggering, by the activity manager, a screen rotation module to perform a screen rotation operation on a display window corresponding to the first target application.

Further, the triggering, by the activity manager, a screen rotation module to perform a screen rotation operation on a display window corresponding to the first target application includes: adjusting, based on the preset window direction of the second interface, width information, height information, and direction information of display content that are of the display window corresponding to the first target application, so that a window direction of the display window corresponding to the first target application is the same as the preset window direction of the second interface.

In a possible implementation, after the triggering, by the activity manager, a screen rotation module to perform a screen rotation operation on a display window corresponding to the first target application, the method further includes: sending, by the activity manager, a resource update event to the first target application, to trigger the first target application to refresh, based on the resource update event, a window layout corresponding to the first target application.

In a possible implementation, the first target application further includes a background application whose prompt window is allowed to pop up.

In a possible implementation, the first application is a desktop application.

In a possible implementation, after the displaying an interface of a first target application in the preset window direction of the second interface, and keeping a window direction of a second target application unchanged, the method further includes: when detecting an operation of closing the second application, displaying the first interface of the first application, where a window display direction of the first interface of the first application is the same as the holding direction of the electronic device.

According to a second aspect, an embodiment of this application provides a screen rotation control method, which may be applied to an electronic device having a display. The method includes: displaying a first interface of a first application, where a window direction of the first interface is the same as a holding direction of the electronic device; when detecting an operation of opening a second interface of the first application by using the first interface of the first application, and determining that a preset window direction of the second interface is different from the holding direction of the electronic device, displaying the second interface in the preset window direction of the second interface; and when detecting an operation of closing the second interface by a user, obtaining the window direction of the first interface, and displaying the first interface in the window direction of the first interface.

In other words, the screen rotation control method provided in this embodiment of this application is mainly for switching between display interfaces of a same application. When the second interface of the first application is closed, a next window that needs to be displayed, that is, a display window of the first interface of the first application, needs to be found, and it is ensured that the first interface of the first application is in a final display status after the second interface of the first application is closed, thereby improving user experience.

In a possible implementation, when detecting an operation of closing the second interface by a user, the obtaining the window direction of the first interface, and displaying the first interface in the window direction of the first interface includes: when an activity manager detects the operation of closing the second interface by the user, obtaining, by the activity manager, the window direction of the first interface, and determining whether the window direction of the first interface is the same as the holding direction of the electronic device; and based on that the window direction of the first interface is different from the holding direction of the electronic device, notifying, by the activity manager, a screen rotation module to perform a screen rotation operation on a display window of the first application, and skipping displaying a screen rotation animation.

Further, the notifying, by the activity manager, a screen rotation module to perform a screen rotation operation on a display window of the first application includes: adjusting, based on the window direction of the first interface, width information, height information, and direction information of display content that are of the display window corresponding to the first application, so that a window direction of the display window corresponding to the first application is the same as a preset window direction of the first interface.

In other words, before the second interface of the first application is closed, a window direction of a next interface that needs to be displayed (that is, the first interface of the first application) needs to be determined, to determine whether a screen rotation operation needs to be performed on the next interface. When a screen rotation operation needs to be performed, the screen rotation operation is performed on the display window of the first application, but a screen rotation animation is not displayed, so that the user is unaware of the screen rotation process, thereby improving operation experience of the user.

In a possible implementation, after the screen rotation module performs the screen rotation operation on the display window of the first application, the activity manager closes a display window of the second interface, displays a closing animation, displays a display window of the first interface, and displays a startup animation.

In other words, a screen rotation decision procedure for a next window that needs to be displayed and a closing animation of a current window are simultaneously executed, to ensure that the first interface of the first application is already updated to the final status after the second interface of the first application is closed, thereby improving user experience.

According to a third aspect, an embodiment of this application provides a screen rotation control apparatus, including: a display unit, configured to display a first interface of a first application, where a window direction of the first interface is the same as a holding direction of the electronic device; and a processing unit, configured to: when detecting an operation of opening a second interface of a second application by using the first interface, and determining that a preset window direction of the second interface is different from the holding direction of the electronic device, trigger the display unit to display an interface of a first target application in the preset window direction of the second interface, and keep a window direction of a second target application unchanged, where the first target application includes the second application, and the second target application includes the first application.

In a possible implementation, the processing unit is further configured to: when detecting that the holding direction of the electronic device changes, determine whether a window display direction of the first target application is the same as a current holding direction of the electronic device; and based on that the window display direction of the first target application is the same as the current holding direction of the electronic device, update a window direction of an application other than the first target application on the electronic device, so that the window direction of the application other than the first target application is the same as the current holding direction of the electronic device; or based on that the window display direction of the first target application is different from the current holding direction of the electronic device, update a window direction of each application on the electronic device, so that the window direction of each application on the electronic device is the same as the current holding direction of the electronic device.

In a possible implementation, when detecting an operation of opening a second interface of a second application by using the first interface, and determining that a preset window direction of the second interface is different from the holding direction of the electronic device, the displaying an interface of a first target application in the preset window direction of the second interface, and keeping a window direction of a second target application unchanged includes: obtaining the preset window direction of the second interface of the second application by using an activity manager, and when the preset window direction is different from the holding direction of the electronic device, triggering, by the activity manager, a screen rotation module to perform a screen rotation operation on a display window corresponding to the first target application.

Further, the triggering, by the activity manager, a screen rotation module to perform a screen rotation operation on a display window corresponding to the first target application includes: adjusting, based on the preset window direction of the second interface, width information, height information, and direction information of display content that are of the display window corresponding to the first target application, so that a window direction of the display window corresponding to the first target application is the same as the preset window direction of the second interface.

In a possible implementation, after the triggering, by the activity manager, a screen rotation module to perform a screen rotation operation on a display window corresponding to the first target application, the following is further included: sending, by the activity manager, a resource update event to the first target application, to trigger the first target application to refresh, based on the resource update event, a window layout corresponding to the first target application.

In a possible implementation, the first target application further includes a background application whose prompt window is allowed to pop up.

In a possible implementation, the first application is a desktop application.

In a possible implementation, after the display unit displays the interface of the first target application in the preset window direction of the second interface, and keeps the window direction of the second target application unchanged, the processing unit is further configured to: when detecting an operation of closing the second application, trigger the display unit to display the first interface of the first application, where a window display direction of the first interface of the first application is the same as the holding direction of the electronic device.

According to a fourth aspect, an embodiment of this application provides a screen rotation control apparatus, including: a display unit, configured to display a first interface of a first application, where a window direction of the first interface is the same as a holding direction of the electronic device; and a processing unit, configured to: when detecting an operation of opening a second interface of the first application by using the first interface of the first application, and determining that a preset window direction of the second interface is different from the holding direction of the electronic device, trigger the display unit to display the second interface in the preset window direction of the second interface; and when detecting an operation of closing the second interface by a user, obtain the window direction of the first interface, and trigger the display unit to display the first interface in the window direction of the first interface.

In a possible implementation, when detecting an operation of closing the second interface by a user, the obtaining the window direction of the first interface, and displaying the first interface in the window direction of the first interface includes: when an activity manager detects the operation of closing the second interface by the user, obtaining, by the activity manager, the window direction of the first interface, and determining whether the window direction of the first interface is the same as the holding direction of the electronic device; and based on that the window direction of the first interface is different from the holding direction of the electronic device, notifying, by the activity manager, a screen rotation module to perform a screen rotation operation on a display window of the first application, and skipping displaying a screen rotation animation.

Further, the notifying, by the activity manager, a screen rotation module to perform a screen rotation operation on a display window of the first application includes: adjusting, based on the window direction of the first interface, width information, height information, and direction information of display content that are of the display window corresponding to the first application, so that a window direction of the display window corresponding to the first application is the same as a preset window direction of the first interface.

In a possible implementation, after the screen rotation module performs the screen rotation operation on the display window of the first application, the activity manager closes a display window of the second interface, displays a closing animation, displays a display window of the first interface, and displays a startup animation.

According to a fifth aspect, an embodiment of this application provides an electronic device, including the apparatus provided in the third aspect or the fourth aspect.

According to a sixth aspect, an embodiment of this application provides a computer storage medium. The computer storage medium stores instructions, and when the instructions are run on a computer, the computer is enabled to perform the method provided in the first aspect, or perform the method provided in the second aspect.

According to a seventh aspect, an embodiment of this application provides a computer product including instructions. When the instructions are run on a computer, the computer is enabled to perform the method provided in the first aspect, or perform the method provided in the second aspect.

BRIEF DESCRIPTION OF DRAWINGS

FIG. 1A to FIG. 1D are a schematic diagram of an application scenario according to an embodiment of this application;

DESCRIPTION OF EMBODIMENTS

Figure 1A:
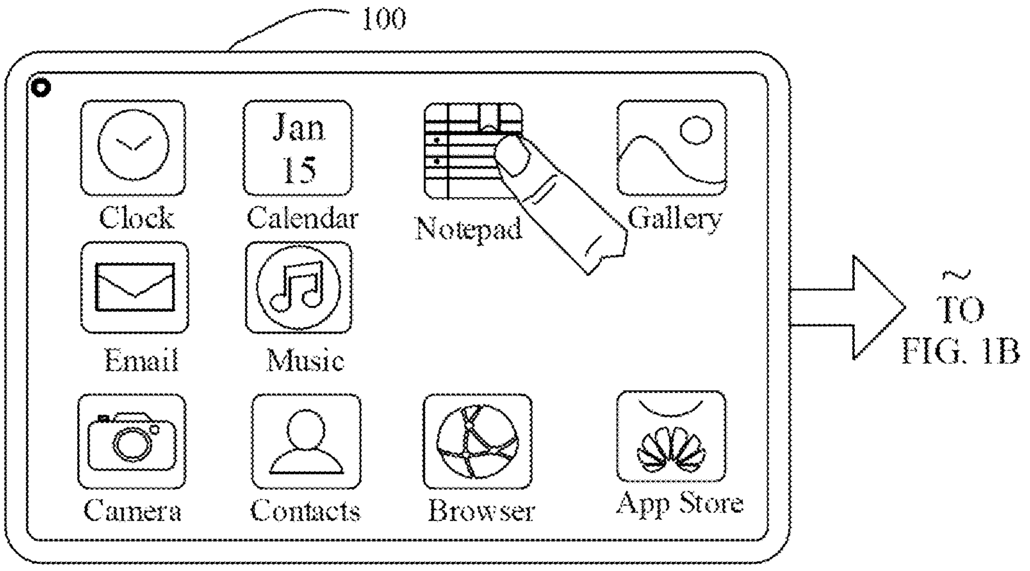
Figure 1B:
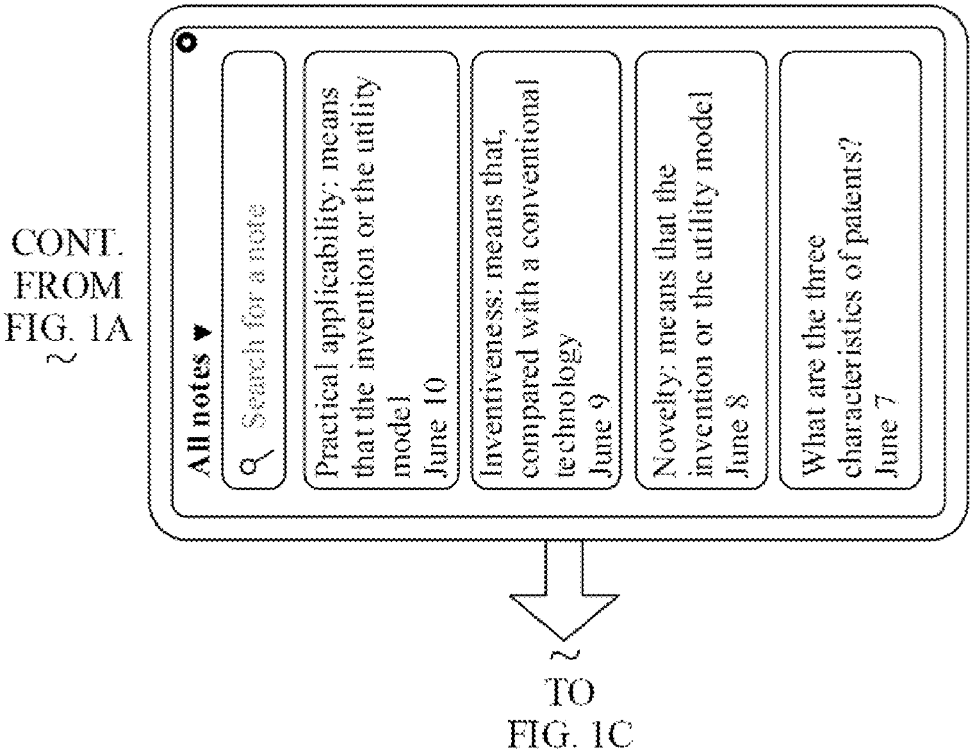

To make objectives, technical solutions, and advantages of embodiments of this application clearer, the following describes the technical solutions in embodiments of this application with reference to accompanying drawings.

Any embodiment or design scheme described as an "example", "for example", or "in an example" in embodiments of this application should not be understood as being more preferred or having more advantages than another embodiment or design scheme. Exactly, use of the words such as "example", "for example", or "in an example" is intended to present a relative concept in a specific manner.

In descriptions of embodiments of this application, a term "and/or" describes only an association relationship for describing associated objects and indicates that three relationships may exist. For example, A and/or B may indicate the following three cases: Only A exists, only B exists, and both A and B exist. In addition, unless otherwise specified, a term "plurality" means two or more. For example, a plurality of systems refer to two or more systems, and a plurality of screen terminals refer to two or more screen terminals.

Moreover, terms "first" and "second" are merely intended for description, and shall not be understood as an indication or implication of relative importance or an implicit indication of an indicated technical feature. Therefore, a feature limited by "first" or "second" may explicitly or implicitly include one or more features. Terms "include", "comprise", "have", and their variants all mean "include but are not limited to", unless otherwise specifically emphasized in another manner.

FIG. 1A to FIG. 1D are a schematic diagram of an application scenario according to an embodiment of this application. As shown in FIG. 1A to FIG. 1D, when an electronic device 100 is held in a landscape orientation, and an application that does not support landscape displaying is opened from a desktop (the desktop supports both landscape displaying and portrait displaying), screen display content on the electronic device is switched to a portrait orientation. In this case, if a back button is pressed to return to the desktop, a display of the electronic device first displays the desktop in the portrait orientation, and then switches to the landscape orientation for displaying, resulting in relatively poor user experience. However, in this embodiment of this application, differentiated management is implemented on a screen rotation status of a foreground display application and a screen rotation status of a background application based on a physical holding status of the current electronic device, so that when a top-layer application returns, a next to-be-displayed application is already in a final display status, thereby improving experience of scenario switching.

It may be understood that, in this embodiment of this application, the electronic device may be a mobile phone, a tablet computer, a digital camera, a personal digital assistant (PDA), a wearable device, or the like. An example embodiment of the electronic device includes but is not limited to an electronic device provided with iOS, Android, Windows, Harmony OS, or another operating system. Alternatively, the electronic device may be another electronic device, for example, a laptop computer having a touch-sensitive surface (for example, a touch panel). A type of the electronic device is not specifically limited in this embodiment of this application.

Figure 2:
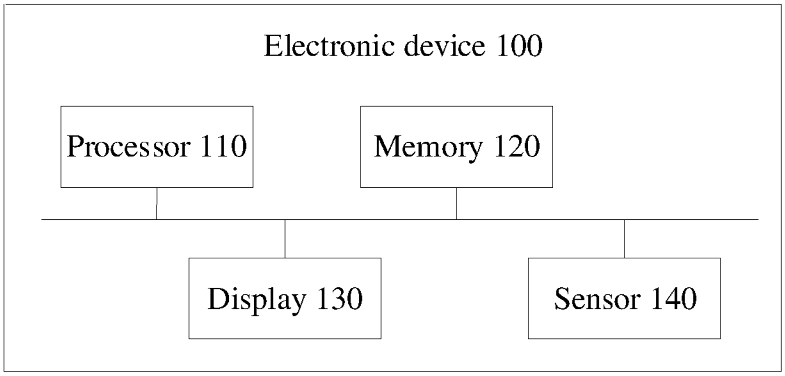
FIG. 2 is a schematic diagram of a hardware structure of an electronic device according to an embodiment of this application.

FIG. 2 is a schematic diagram of a hardware structure of an electronic device according to an embodiment of this application. As shown in FIG. 2, the electronic device 100 may include a processor 110, a memory 120, a display 130, and a sensor 140. It may be understood that the structure shown in this embodiment of this solution does not constitute a specific limitation on the electronic device 100. In some other embodiments of this solution, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may be a general-purpose processor or a dedicated processor. For example, the processor 110 may include a central processing unit (CPU) and/or a baseband processor. The baseband processor may be configured to process communication data, and the CPU may be configured to implement corresponding control and processing functions, execute a software program, and process data of the software program.

The memory 120 may store a program (which may alternatively be instructions or code), and the program may be run by the processor 110, so that the processor 110 performs a method described in this solution. Optionally, the memory 120 may store instructions or data that has just been used or is repeatedly used by the processor 110. If the processor 110 needs to use the instructions or the data again, the processor 110 may directly invoke the instructions or the data from the memory 120, to avoid repeated access and reduce a waiting time of the processor 110, thereby improving system efficiency.

The display 130 is configured to display an image, a video, and the like. The display 130 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some examples, the electronic device 100 may include one or more displays 130. In an example, the display 130 may be configured to display an interface of an application.

The sensor 140 may include a pressure sensor, a gyro sensor, a barometric pressure sensor, a magnetic sensor, an acceleration sensor, a distance sensor, an optical proximity sensor, a fingerprint sensor, a temperature sensor, an ambient light sensor, a bone conduction sensor, and the like.

In this solution, the sensor 140 may also include a gravity sensor and a touch sensor. The gravity sensor may be configured to detect whether a holding direction of the electronic device changes. Specifically, an acceleration change caused by gravity may be measured by using the gravity sensor, and a tilt angle of the electronic device relative to a horizontal plane may be calculated, to determine whether the holding direction of the electronic device changes.

The touch sensor may be configured to detect a touch operation performed on or near the touch sensor. The touch sensor may collect a touch event of a user on or near the touch sensor (for example, an operation performed by the user on a surface of the touch sensor by using any suitable object such as a finger or a stylus), and send collected touch information to another component, for example, the processor 110. In a possible example, the touch sensor sends, to the processor 110, a touch event collected from a display screen of the electronic device 100, so that the processor 110 may determine, based on the touch event, whether a display interface on the display screen of the electronic device 100 is switched.

For example, the touch sensor may be implemented in a plurality of manners, such as a resistive type, a capacitive type, an infrared type, and a surface acoustic wave type. The touch sensor may be disposed on the display 130, and the touch sensor and the display 130 constitute a touchscreen, which is also referred to as a "touch screen." Alternatively, the touch sensor and the display 130 may be used as two independent components to implement input and output functions of the electronic device 100.

It may be understood that a software system of the electronic device 100 may use a layered architecture, an event-driven architecture, a microkernel architecture, a microservice architecture, or a cloud architecture. In this solution, an Android system with a layered architecture is used as an example to describe a software structure of the electronic device 100.

Figure 3:
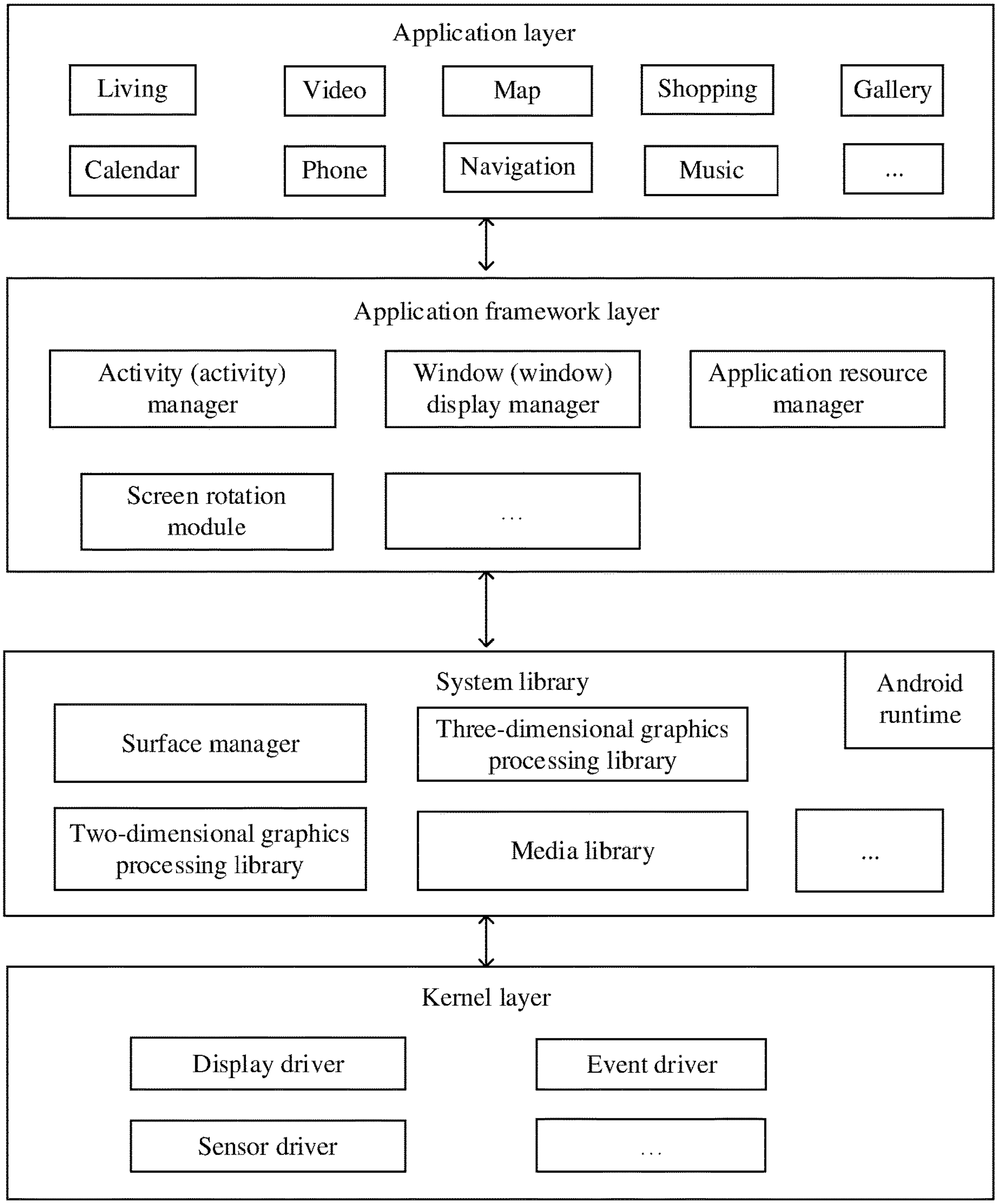
FIG. 3 is a schematic diagram of an architecture of an operating system in an electronic device according to an embodiment of this application.

FIG. 3 is a block diagram of the software structure of the electronic device 100 according to this embodiment of this application.

In the layered architecture, software is divided into several layers, and each layer has a clear role and responsibility. The layers communicate with each other through a software interface. In some embodiments, the Android system is divided into four layers: an application layer, an application framework layer, an Android runtime and system library, and a kernel layer from top to bottom. For a mobile terminal operating system developed by Huawei, refer to this structure.

1. Application Layer

The application layer may include a series of application packages. As shown in FIG. 3, the application packages may include applications (APPs) such as Living, Video, Map, Shopping, Gallery, Calendar, Phone, Navigation, and Music.

2. Application Framework Layer

The application framework layer provides an application programming interface (API) and a programming framework for an application at the application layer. The application framework layer includes some predefined functions.

As shown in FIG. 3, the application framework layer may include an activity manager, a window display manager, an application resource manager, a screen rotation module, and the like.

The activity manager is configured to be responsible for management of an activity component, mainly including activity startup management, status management, lifecycle management, and the like.

The window display manager is configured to be responsible for window display management, mainly including a window display hierarchy, window display coordinates, a window display animation, and the like.

The application resource manager is configured to be responsible for managing an application resource, managing a resource loaded by an application, updating resource information such as a screen width, height, and density to the application, and sending resource update callback to the application when a window of the application changes, so that the application refreshes a layout in a timely manner based on new window information.

The screen rotation module is configured to be responsible for screen rotation management of the system, and is responsible for listening to a sensor event, to implement screen rotation decision management, screen rotation animation execution, screen rotation notification, and the like.

3. Android Runtime and System Library

The Android runtime includes a kernel library and a virtual machine. The Android runtime is responsible for scheduling and management of the Android system.

The kernel library includes two parts: a functional function that needs to be invoked in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a two-dimensional graphics engine (for example, SGL).

The surface manager is configured to manage a display subsystem and provide fusion of 2D and 3D layers for a plurality of applications. The media library supports playback and recording in a plurality of commonly used audio and video formats, static image files, and the like. The media library may support a plurality of audio and video encoding formats, for example, MPEG-4, H.264, MP3, AAC, AMR, JPG, and PNG. The three-dimensional graphics processing library is configured to implement three-dimensional graphics drawing, image rendering, synthesis, layer processing, and the like. The 2D graphics engine is a drawing engine for 2D drawing.

4. Kernel Layer

The kernel layer is a layer between hardware and software. The kernel layer includes at least a display driver, a camera driver, an audio driver, and a sensor driver.

All technical solutions in the following embodiments may be implemented on the electronic device 100 that has the foregoing hardware architecture and software architecture.

With reference to the accompanying drawings, the following describes in detail the technical solutions provided in this application, by using an example in which the electronic device 100 is a tablet.

Figure 4A:
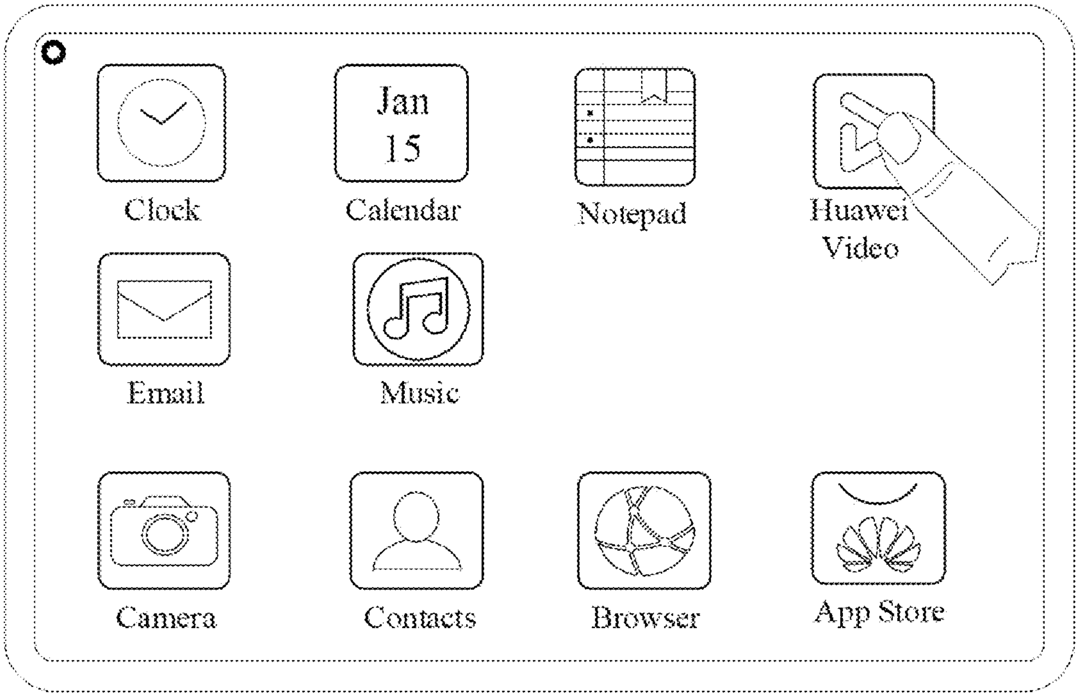
FIG. 4*a* is a schematic diagram of a display interface on an electronic device according to an embodiment of this application.

As shown in FIG. 4*a*, desktop applications are displayed in a landscape displaying manner on the tablet held in a landscape orientation, so that icons of a plurality of applications may be displayed on a display screen of the tablet, and a user may open a display interface of an application by triggering an icon of the application. For example, when the user taps a video application on a desktop by using a finger, the tablet determines, in response to the tap operation of the user, whether a preset window direction of an initial interface of the video application is the same as a current holding direction of the tablet. When the window direction of the initial interface of the video application is different from the current holding direction of the tablet, for example, the preset window direction of the initial interface of the video application is a portrait direction, and the current holding direction of the tablet is a landscape direction, an interface shown in FIG. 4*b* is displayed, but a preset window direction of the desktop applications needs to be kept unchanged.

Figure 4B:
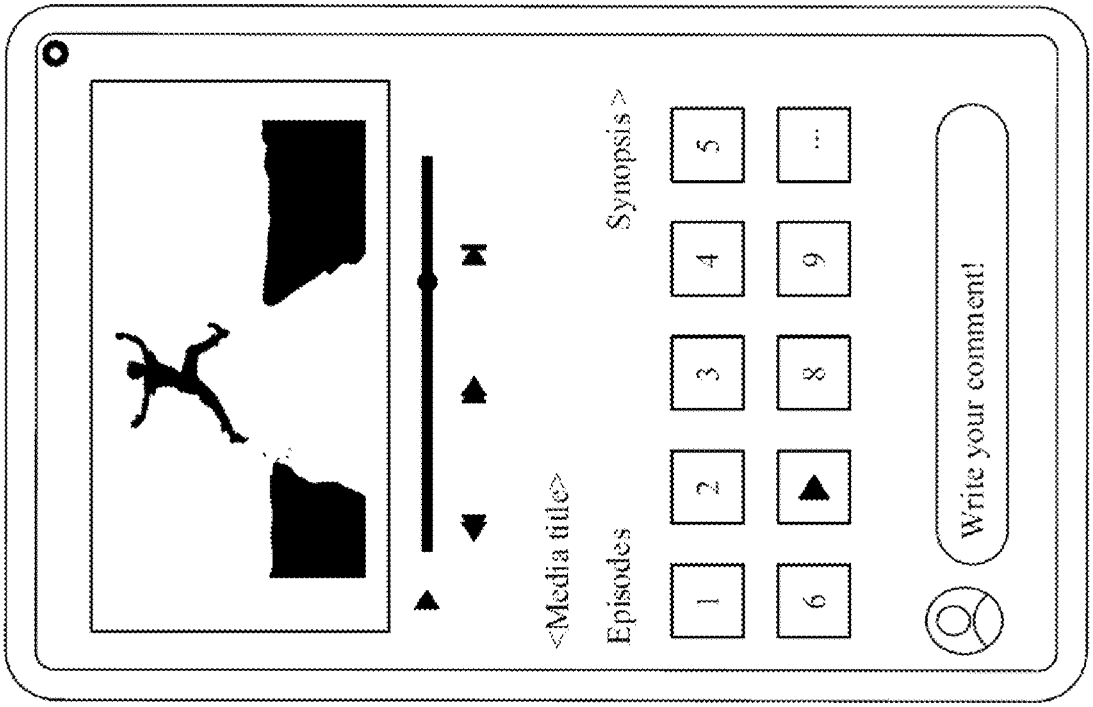
FIG. 4*b* is a schematic diagram of another display interface on an electronic device according to an embodiment of this application.

On the interface that is displayed by the tablet and that is shown in FIG. 4*b*, the holding direction of the tablet is the landscape direction, and a window display direction of the initial interface of the video application displayed on the display screen of the tablet is the portrait direction. When the user enters, on the tablet display interface shown in FIG. 4*b*, a preset operation instruction for exiting the current interface, for example, taps a back button on the screen or slides in a specific direction on the screen, the tablet directly returns to the desktop application display interface shown in FIG. 4*a*, in response to the detected instruction entered by the user.

Figure 4C:
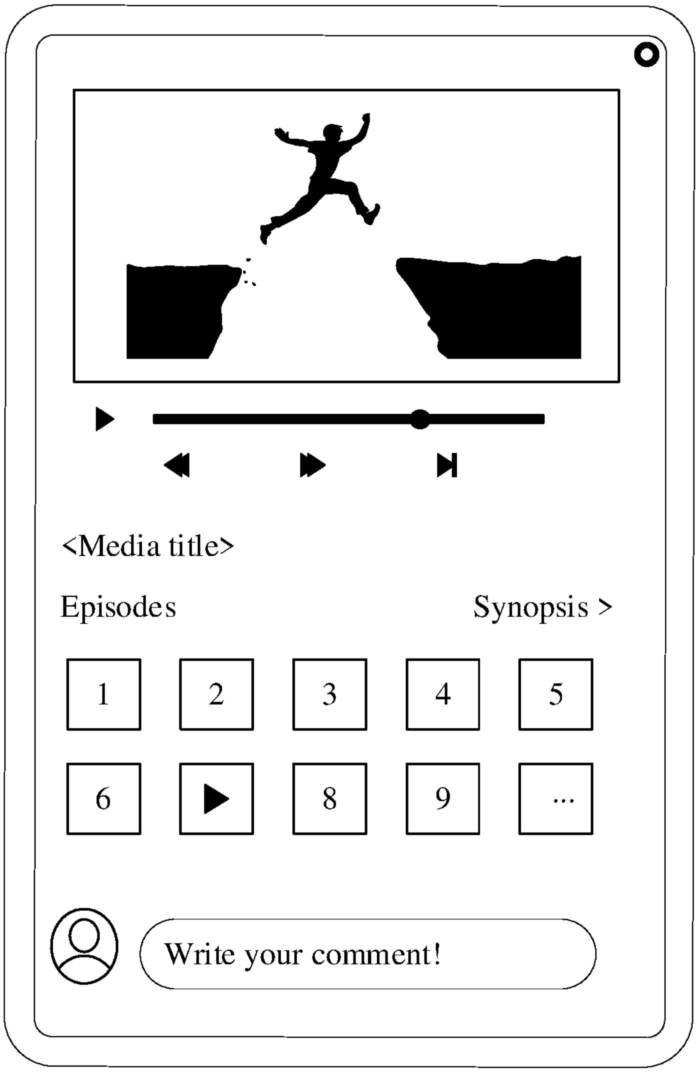
FIG. 4*c* is a schematic diagram of another display interface on an electronic device according to an embodiment of this application.

Further, for the tablet display interface shown in FIG. 4*b*, when the user switches the tablet held in the landscape orientation to portrait holding shown in FIG. 4*c*, because the initial interface of the video application displayed on the tablet display interface shown in FIG. 4*b* is already displayed in the portrait orientation, when the tablet is switched from a landscape holding state to a portrait holding state, the window direction of the initial interface of the video application displayed on the display screen of the tablet does not change. Further, on the tablet display interface shown in FIG. 4*b*, when the initial interface of the video application is displayed in the portrait window display direction, a preset window direction of an application (including a desktop application) other than the video application does not change. That is, on the tablet display interface shown in FIG. 4*b*, the preset window direction of the application other than the video application is still the landscape orientation for displaying. Therefore, when the tablet is switched from the landscape holding state shown in FIG. 4*b* to the portrait holding state shown in FIG. 4*c*, the preset window direction of the application other than the video application needs to be updated to the landscape direction.

Figure 5A:
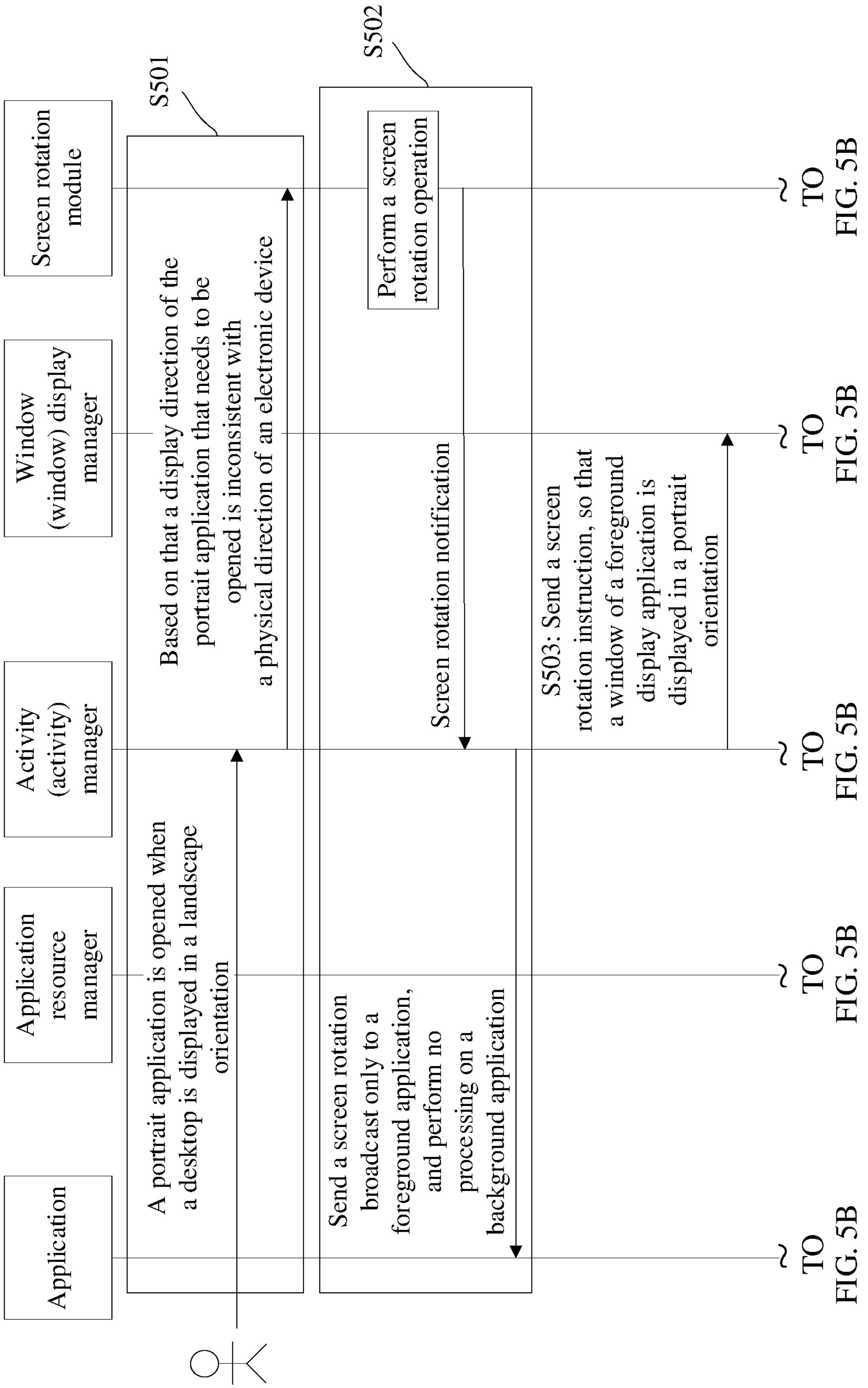
FIG. 5A and FIG. 5B are a schematic flowchart of a screen rotation control method according to an embodiment of this application.
Figure 5B:
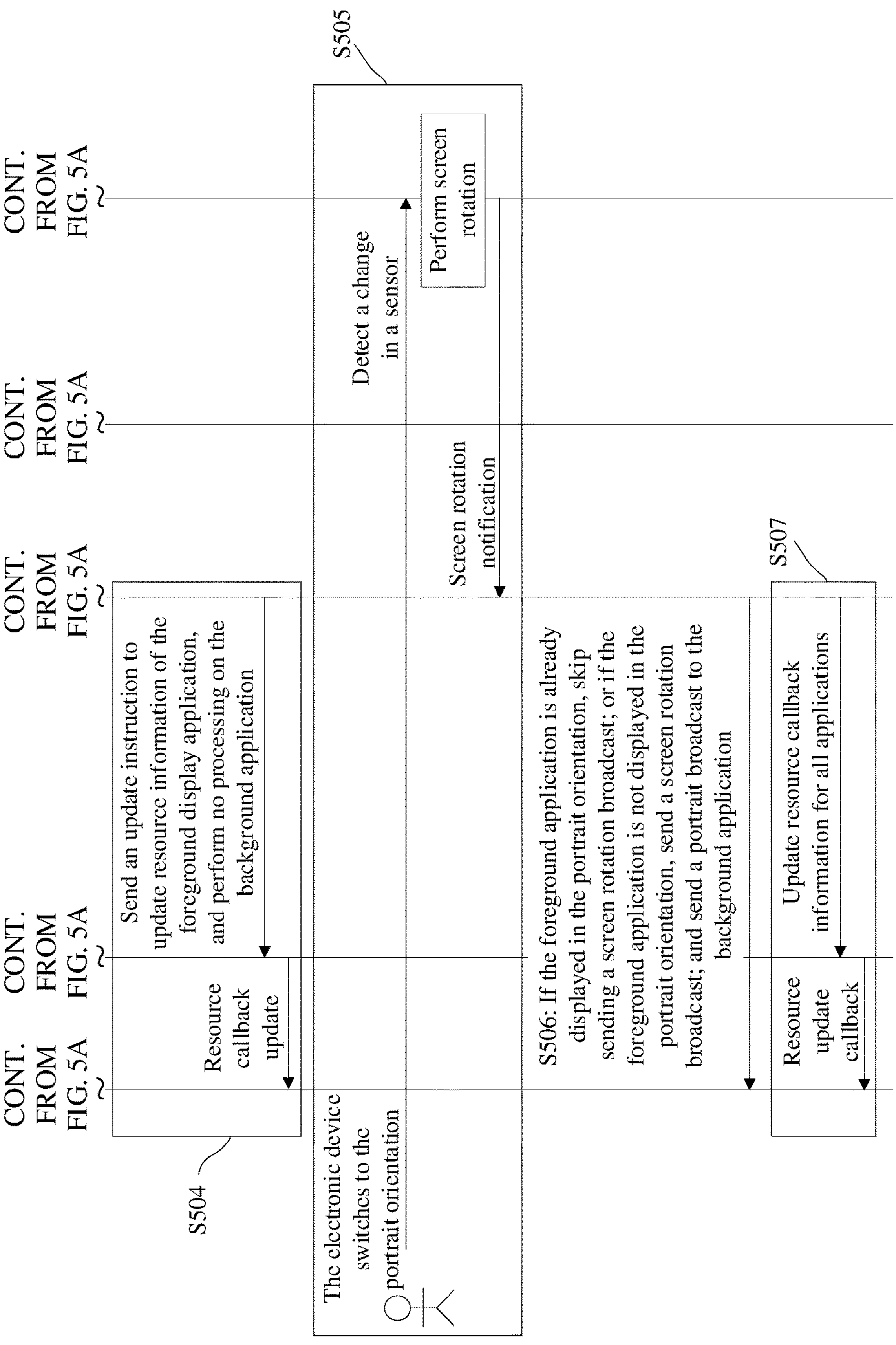

With reference to FIG. 5A and FIG. 5B, the following uses a landscape holding scenario as an example to describe a screen rotation control method provided in an embodiment of this application. The method includes the following steps.

Step S501: In response to an operation instruction of a user for opening an initial interface of Huawei Video in desktop applications displayed in a landscape orientation, an activity manager obtains a preset window direction of the initial interface of Huawei Video, and when the obtained preset window direction is different from a holding direction of a tablet, the activity manager triggers a screen rotation module to perform a screen rotation operation on a display window corresponding to a first target application including Huawei Video.

In this embodiment of this application, the holding direction of the tablet includes a portrait direction, a reverse portrait direction, a landscape direction, and a reverse landscape direction. When a current holding direction of the tablet is determined, the holding direction of the current tablet may be obtained based on a gravity sensor installed in the tablet.

A preset window direction is an expected display direction of a window that needs to be opened. Specifically, each display window corresponds to a default display direction and a dynamic display direction. A priority of the dynamic display direction is higher than a priority of the default display direction. That is, when the user opens a new display window, if a dynamic display direction is set for the window, the currently required dynamic display direction is used as a preset window direction; or if no dynamic display direction is set for the window, a default display direction of the window is used as a preset window direction.

The first target application is an application that has a display layer on a display interface of the current tablet, for example, a status bar, another floating window, or another screen split application. Further, the first target application may alternatively be configured by a system side. Specifically, a whitelist may be preset by the system side.

Step S502: The screen rotation module performs the screen rotation operation on the display window of the first target application, and sends a screen rotation notification to the activity manager.

In an example, the first target application may be determined by the activity manager. When triggering the screen rotation module to perform the screen rotation operation, the activity manager may synchronously send, to the screen rotation module, information about the first target application on which the screen rotation operation needs to be performed. Alternatively, before performing the screen rotation operation, the screen rotation module determines the first target application on which the screen rotation operation needs to be performed.

Before performing the screen rotation operation on the display window of the first target application, the screen rotation module first needs to obtain size information, that is, length information and width information, of a display window corresponding to each application in the first target application, and direction information of display content in each display window, then exchanges the length information and the width information that are of each display window, and adjusts a direction of the display content in the display window of each application to be the same as a preset direction of the display window of each application.

When completing the screen rotation operation, the screen rotation module sends the screen rotation notification to the activity manager. The screen rotation notification is used to trigger the activity manager to perform a subsequent screen rotation operation.

Further, after receiving the screen rotation notification from the screen rotation module, the activity manager sends a screen rotation broadcast only to the first target application on which the screen rotation operation needs to be performed.

Step S503: The activity manager sends a screen rotation instruction to a window information manager, so that the display window corresponding to the first target application is displayed in a portrait orientation.

After sending the screen rotation broadcast to the first target application, the activity manager further needs to send the screen rotation instruction to the window display manager, so that a display interface of a newly opened application may be displayed in a portrait mode.

Step S504: The activity manager sends an update instruction to an application resource manager, so that the application resource manager updates resource information of the first target application, and sends a resource update callback instruction to the first target application after the update is completed.

The update instruction sent by the activity manager to the application resource manager includes a resource update event of the first target application, so that the application resource manager updates only the resource information of the first target application.

Each application in the first target application corresponds to one resource update event. Each resource update event includes width information, height information, direction information, and display-related information that are of an application that needs to be updated. If the application resource manager cannot receive these events, the application resource manager does not actively trigger layout refreshing on a display window of the application that needs to be updated.

It should be noted that there is no sequence between step S503 and step S504, and step S503 and step S504 may be simultaneously performed, or step S503 may be first performed, or step S504 may be first performed.

In this embodiment of this application, for switching between windows of different applications, when a preset window direction of an application newly opened by the user is different from a holding direction of a current electronic device, screen rotation processing needs to be performed only on the newly opened application and an application that has a display layer on a display interface of the current electronic device. A window display direction of another application continues to be kept the same as the holding direction of the current electronic device, that is, an application other than the newly opened application and the application that has the display layer on the display interface of the current electronic device is unaware of a screen rotation event.

Further, after a gravity sensor installed in the electronic device detects that the holding direction of the electronic device changes, the screen rotation module is triggered to perform a screen rotation operation. A specific operation process includes the following steps.

Step S505: The screen rotation module obtains the holding direction of the current electronic device and a display window direction of an application displayed on the current electronic device, performs a screen rotation operation based on the holding direction of the current electronic device and the display window direction of the application displayed on the current electronic device, and sends a screen rotation notification to the activity manager, where the screen rotation notification is used to trigger the activity manager to perform a subsequent screen rotation operation.

The screen rotation module compares the obtained holding direction of the current electronic device with the display window direction of the application displayed on the current electronic device. When the display window direction of the application displayed on the current electronic device is the same as the holding direction of the electronic device, a screen rotation operation is performed on an application other than the application displayed on the current electronic device and the application that has the display layer on the display interface of the current electronic device. The screen rotation operation performed by the screen rotation module includes: exchanging length information and width information that are of a display window of an application on which screen rotation needs to be performed, and adjusting a direction of display content in the display window, so that the direction of the display content in the display window is the same as the holding direction of the current electronic device.

When the display window direction of the application displayed on the current electronic device is different from the holding direction of the electronic device, the screen rotation module needs to perform a screen rotation operation on all applications on the current electronic device.

There is no sequence between the two actions of performing the screen rotation operation by the screen rotation module and sending the screen rotation notification to the activity manager, and the two actions may be simultaneously performed.

Step S506: After receiving the screen rotation notification, the activity manager determines, based on the received screen rotation notification, an application that is on the current electronic device and on which screen rotation needs to be performed, and sends the screen rotation notification to the application on which screen rotation needs to be performed.

Further, after receiving the screen rotation notification, the activity manager determines a display window of an application on the current electronic device, to determine the application on which screen rotation needs to be performed, and sends a screen rotation broadcast to the application on which screen rotation needs to be performed. Alternatively, after receiving the screen rotation notification, the activity manager obtains, from the screen rotation notification, information about the application that is on the current electronic device and on which screen rotation needs to be performed, and sends, based on the application information carried in the screen rotation notification, the screen rotation notification to the application on which screen rotation needs to be performed.

Step S507: The activity manager sends an update instruction to the application resource manager, so that the application resource manager updates resource information of an application other than a current display application and a system interface display application related to the current display application, and sends a resource update callback instruction to a corresponding application.

It should be noted that this embodiment of this application uses the landscape holding scenario as an example, but is not limited to the landscape holding scenario, and is also applicable to a portrait holding scenario.

Figure 6A:
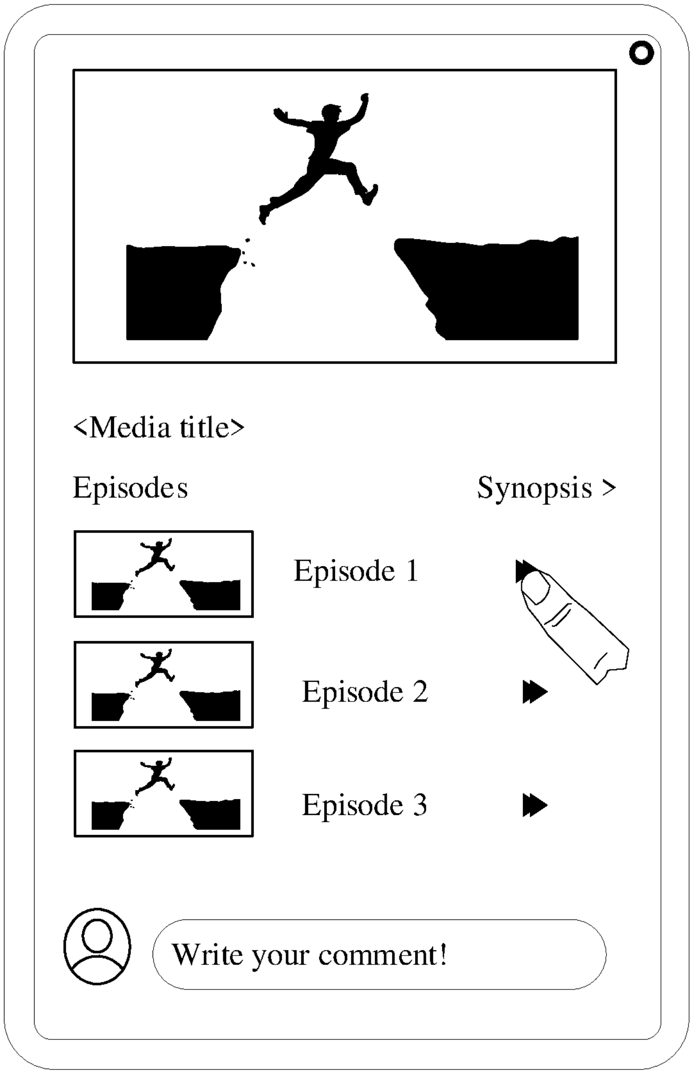
FIG. 6*a* is a schematic diagram of a display interface on an electronic device according to an embodiment of this application.

In a possible embodiment, a video application is opened on a display interface of a tablet held in a portrait orientation, and a first interface of the opened video application is shown in FIG. 6*a*. A video of a first episode of a selected media file is opened on the tablet interface shown in FIG. 6*a* for playing. In this case, the video application jumps to a second interface shown in FIG. 6*b*.

Figure 6B:
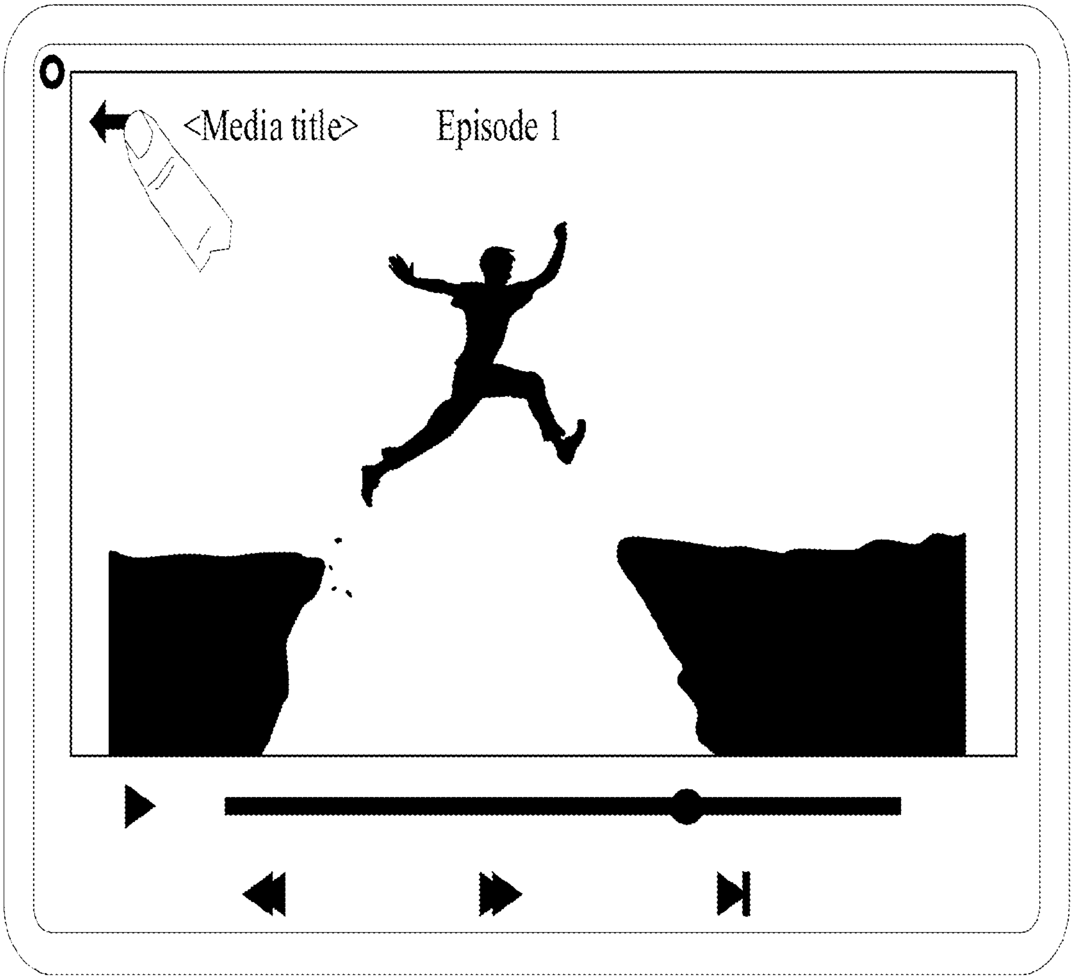
FIG. 6*b* is a schematic diagram of another display interface on an electronic device according to an embodiment of this application.

On a display interface that is of the tablet and that is shown in FIG. 6*b*, a holding direction of the tablet is a portrait direction, and a window direction of the opened second interface is a landscape direction. When a user enters, on the tablet display interface shown in FIG. 6*b*, a preset operation instruction for exiting the current interface, for example, taps a back button on a screen or slides in a specific direction on the screen, the tablet directly returns to the first interface that is of the video application and that is shown in FIG. 6*a*, in response to the detected instruction entered by the user.

A process of opening the second interface of the video application by using the first interface of the video application includes: determining whether a window display direction of the second interface of the video application is the same as the holding direction of the current tablet. When the window display direction of the second interface is different from the holding direction of the current tablet, a screen rotation operation is performed on all applications on the current tablet.

Figure 7:
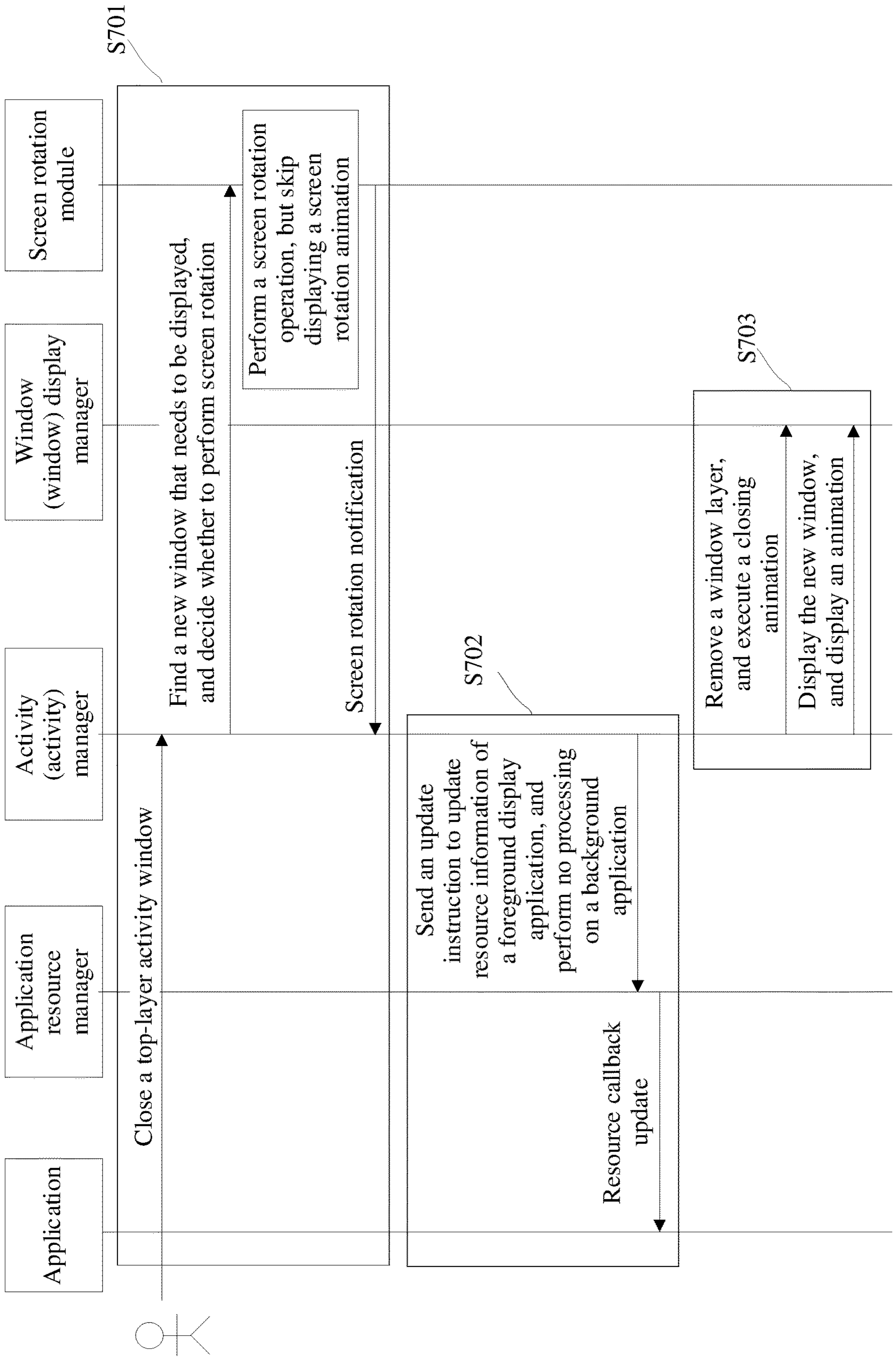
FIG. 7 is a schematic flowchart of a screen rotation control method according to an embodiment of this application.

With reference to FIG. 7, the following uses a portrait holding scenario as an example to describe a process of closing the second display interface of the video application in this embodiment of this application. The process includes the following steps.

Step S701: In response to an operation instruction of the user for closing the second interface, an activity manager obtains a window direction corresponding to the first interface, and when the obtained window direction is different from a holding direction of a current electronic device, triggers a screen rotation module to perform a screen rotation operation on a display window of the video application and send a screen rotation notification to the activity manager.

Because the second interface of the video application is opened by using the first interface, when a display window of the second interface is closed, a next window that needs to be displayed is a display window of the first interface.

When performing the screen rotation operation, the screen rotation module first needs to obtain preset window direction information of the window corresponding to the first interface, exchanges width information and height information that are of the display window of the first interface based on the preset window direction information, and adjusts a direction of content in the display window of the first interface, so that a direction of next content that needs to be displayed is the same as a preset window direction.

Further, when performing the screen rotation operation on the next window that needs to be displayed, the screen rotation module does not need to execute a screen rotation animation. In this way, the user is unaware of the screen rotation operation.

Step S702: The activity manager sends an update instruction to an application resource manager in response to the received screen rotation notification, so that the application resource manager updates resource information of all applications on the electronic device.

Step S703: The activity manager triggers a window display manager to execute an operation instruction for closing the second interface, execute a closing animation, and display the display window of the first interface.

In this embodiment of this application, for switching between different windows in a same application, before the activity manager closes a window, the activity manager searches for a next window that needs to be displayed, and performs a screen rotation decision and execution procedure. A resource and a status that are of the next window that needs to be displayed are already updated to a final direction before the current window is closed. Closing a window usually takes a time that varies in hundreds of millimeters. Therefore, when the window is closed, the next window that needs to be displayed and that is seen by the user is already in a display status in a final direction. A screen rotation decision procedure, window closing, and an animation are simultaneously executed, to ensure that the status of the next window that needs to be displayed is already updated to a final status after a top-layer window is closed, so that experience is relatively smooth.

It should be noted that this embodiment of this application uses the portrait holding scenario as an example, but is not limited to the portrait holding scenario, and is also applicable to a landscape holding scenario.

Figure 8:
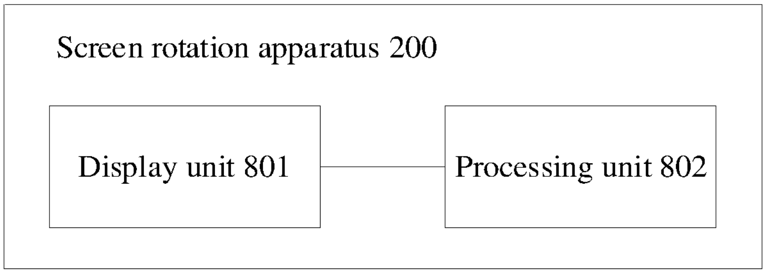
FIG. 8 is a schematic diagram of a structure of a screen rotation apparatus according to an embodiment of this application.

Based on the methods in the foregoing embodiments, an embodiment of this application further provides a screen rotation apparatus. The screen rotation apparatus is deployed on an electronic device having a display. FIG. 8 is a schematic diagram of a structure of a screen rotation apparatus according to an embodiment of this application. As shown in FIG. 8, the screen rotation apparatus 200 includes a display unit 801 and a processing unit 802.

The display unit 801 is configured to display a first interface of a first application, where a window direction of the first interface is the same as a holding direction of the electronic device.

The processing unit 802 is configured to: when detecting an operation of opening a second interface of a second application by using the first interface, and determining that a preset window direction of the second interface is different from the holding direction of the electronic device, trigger the display unit 801 to display an interface of a first target application in the preset window direction of the second interface, and keep a window direction of a second target application unchanged. The first target application includes the second application, and the second target application includes the first application.

In a possible embodiment, the preset window direction of the second interface of the second application may be obtained by using an activity manager, and when the obtained preset window direction is different from the holding direction of the electronic device, the activity manager triggers a screen rotation module to perform a screen rotation operation on a display window corresponding to the first target application, specifically including: adjusting, based on the preset window direction of the second interface, width information, height information, and direction information of display content that are of the display window corresponding to the first target application, so that a window direction of the display window corresponding to the first target application is the same as the preset window direction of the second interface.

Further, after the activity manager triggers the screen rotation module to perform the screen rotation operation on the display window corresponding to the first target application, the activity manager further needs to send a resource update event to the first target application, to trigger the first target application to refresh, based on the resource update event, a window layout corresponding to the first target application.

In a possible example, the first target application includes a background application whose prompt window is allowed to pop up.

In a possible example, the first application is a desktop application.

In a possible embodiment, after the display unit displays the interface of the first target application in the preset window direction of the second interface, and keeps the window direction of the second target application unchanged, when detecting that the holding direction of the electronic device changes, the processing unit 802 determines whether a window display direction of the first target application is the same as a current holding direction of the current electronic device.

Based on that the window display direction of the first target application is the same as the current holding direction of the current electronic device, a window direction of an application other than the first target application on the electronic device is updated, so that the window direction of the application other than the first target application is the same as the current holding direction of the electronic device.

Based on that the window display direction of the first target application is different from the current holding direction of the electronic device, a window direction of each application on the current electronic device is updated, so that the window direction of each application on the current electronic device is the same as the current holding direction of the electronic device.

In a possible embodiment, when detecting an operation of closing the second application by a user, the processing unit 802 triggers the display unit 801 to display the first interface of the first application, where a window display direction of the first interface of the first application is the same as the holding direction of the electronic device.

In this embodiment of this application, if a display direction of an application is inconsistent with the holding direction of the current electronic device, screen rotation processing is performed only on a foreground application that includes a current display application of the device. Another application continues to maintain a landscape state and is unaware of a screen rotation event. When the holding direction of the current electronic device changes, for example, when the holding direction of the current electronic device changes from landscape holding to portrait holding, a window display direction of another application in the landscape state is updated to a portrait orientation for displaying. In this embodiment of this application, independent screen rotation control is performed on a foreground display application and another application, so that a window display direction of the another application is always consistent with a holding direction of a corresponding electronic device.

Figure 9:
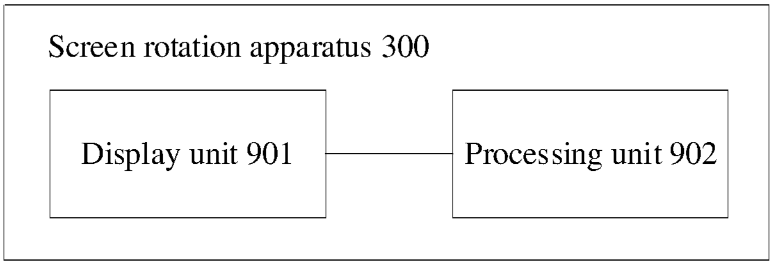
FIG. 9 is a schematic diagram of a structure of another screen rotation apparatus according to an embodiment of this application.

Based on the methods in the foregoing embodiments, an embodiment of this application further provides a screen rotation apparatus. FIG. 9 is a schematic diagram of a structure of a screen rotation apparatus according to an embodiment of this application. As shown in FIG. 9, the screen rotation apparatus 300 includes a display unit 901 and a processing unit 902.

The display unit 901 is configured to display a first interface of a first application, where a window direction of the first interface is the same as a holding direction of a current electronic device.

The processing unit 902 is configured to: when detecting an operation of opening a second interface of the first application by using the first interface of the first application, and determining that a preset window direction of the second interface is different from the holding direction of the current electronic device, trigger the display unit 901 to display the second interface in the preset window direction of the second interface. Further, the processing unit 902 is further configured to: when detecting an operation of closing the second interface by a user, obtain the window direction of the first interface, and trigger the display unit 901 to display the first interface in the window direction of the first interface.

In a possible embodiment, when the operation of closing the second interface by the user is detected by using an activity manager, a next interface that needs to be displayed is obtained as the first interface, the window direction of the first interface is obtained by using the activity manager, and it is determined whether the window direction of the first interface is the same as the holding direction of the current electronic device. Based on that the window direction of the first interface is different from the holding direction of the current electronic device, the activity manager notifies the screen rotation module to perform a screen rotation operation on a display window of the first application, and skips displaying a screen rotation animation.

That the screen rotation module performs the screen rotation operation on the display window of the first application includes: adjusting, based on the window direction of the first interface, width information, height information, and direction information of display content that are of the display window of the first application, so that a window direction of the display window corresponding to the first application is the same as a preset window direction of the first interface.

After the screen rotation module completes the screen rotation operation on the display window of the first application, the activity manager closes a display window of the second interface, displays a closing animation, displays a display window of the first interface, and displays a startup animation.

In this embodiment of this application, before a system performs an operation of closing a top-layer window, a next window that needs to be displayed needs to be found in advance, and a screen rotation decision is made based on a preset window direction of the next window that needs to be displayed. For example, when the preset window direction of the next window that needs to be displayed is different from the holding direction of the current electronic device, a screen rotation operation needs to be performed. Specifically, when the screen rotation operation is performed, a screen rotation animation does not need to be executed, and only a screen rotation notification, a resource, and the like need to be updated for all applications. In addition, no processing is performed on a top-layer window that is being closed, including actions such as a screen rotation animation, screen rotation notification, and resource refreshing. Because the top-layer window is not closed at this time, the top-layer window does not need to be processed. After the screen rotation operation is performed, the top-layer window that needs to be closed is removed, and a closing animation is displayed. When the top-layer window that needs to be closed is removed, a startup special effect of a new window is displayed. At this time, a display status of the new window is already a final display status.

Based on the apparatuses in the foregoing embodiments, an embodiment of this application further provides an electronic device. The electronic device includes any screen rotation apparatus provided in the foregoing embodiments.

The method steps in embodiments of this application may be implemented in a hardware manner, or may be implemented in a manner of executing software instructions by a processor. The software instructions may include corresponding software modules. The software modules may be stored in a random access memory (RAM), a flash memory, a read-only memory (ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

It may be understood that various numeric numbers in embodiments of this application are merely used for differentiation for ease of description, and are not intended to limit the scope of embodiments of this application.

What is claimed is:

1. A screen rotation control method, applied to an electronic device having a display, wherein the method comprises:

displaying a first interface of a first application of a plurality of applications, wherein a window direction of the first interface is the same as a holding direction of the electronic device;

based on detecting an operation of opening a second interface of the first application by using the first interface of the first application, and based on determining that a preset window direction of the second interface is different from the holding direction of the electronic device, displaying the second interface in full screen in the preset window direction of the second interface;

based on detecting an operation of closing the second interface by a user, and based on the window direction of the first interface being different from the holding direction of the electronic device;

determining that a screen rotation animation is to be skipped;

performing a screen rotation operation on a display window of the first interface without displaying the screen rotation animation, and then after performing the screen rotation operation, displaying a closing animation, closing the second interface, and displaying the first interface.

2. The method according to claim 1, wherein based on detecting the operation of closing the second interface by the user, and based on the window direction of the first interface being different from the holding direction of the electronic device, performing the screen rotation operation on the display window of the first interface comprises:

based on an activity manager of the electronic device detecting the operation of closing the second interface by the user, obtaining, by the activity manager, the window direction of the first interface, and determining whether the window direction of the first interface is the same as the holding direction of the electronic device; and based on that the window direction of the first interface is different from the holding direction of the electronic device, notifying, by the activity manager, a screen rotation manager to perform a screen rotation operation on the display window of the first interface, and skipping displaying a screen rotation animation.

3. The method according to claim 2, wherein the notifying, by the activity manager, the screen rotation manager to perform the screen rotation operation on the display window of the first interface comprises:

adjusting, based on the window direction of the first interface, width information, height information, and direction information of display content that are of the display window corresponding to the first application, so that a window direction of the display window corresponding to the first application is the same as the window direction of the first interface.

4. The method according to claim 2, wherein after the screen rotation manager performs the screen rotation operation on the display window of the first interface, the method further comprises:

closing, by the activity manager, a display window of the second interface, displaying, by the activity manager, the closing animation, displaying, by the activity manager, a display window of the first interface, and displaying, by the activity manager, a startup animation.

5. The method according to claim 1, wherein prior to determining that the preset window direction of the second interface is different from the holding direction of the electronic device, the method further comprises: determining the preset window direction of the second interface by identifying whether a dynamic display direction is set for the second interface, wherein the dynamic display direction has a higher priority than a default display direction; if the dynamic display direction is set, using the dynamic display direction as the preset window direction; and if no dynamic display direction is set, using the default display direction as the preset window direction.

6. An electronic device comprising:

one or more processors; and a non-transitory computer readable medium which contains computer-executable instructions;

the one or more processors are configured to execute the computer-executable instructions to enable the electronic device to perform operations comprising:

displaying a first interface of a first application of a plurality of applications, wherein a window direction of the first interface is the same as a holding direction of the electronic device;

based on detecting an operation of opening a second interface of the first application by using the first interface of the first application, and based on determining that a preset window direction of the second interface is different from the holding direction of the electronic device, displaying the second interface in full screen in the preset window direction of the second interface;

based on detecting an operation of closing the second interface by a user, and based on the window direction of the first interface being different from the holding direction of the electronic device:

determining that a screen rotation animation is to be skipped;

performing a screen rotation operation on a display window of the first interface without displaying the screen rotation animation, and then after performing the screen rotation operation, displaying a closing animation, closing the second interface, and displaying the first interface.

7. The electronic device according to claim 6, wherein prior to determining that the preset window direction of the second interface is different from the holding direction of the electronic device, the operations further comprise: determining the preset window direction of the second interface by identifying whether a dynamic display direction is set for the second interface, wherein the dynamic display direction has a higher priority than a default display direction; if the dynamic display direction is set, using the dynamic display direction as the preset window direction; and if no dynamic display direction is set, using the default display direction as the preset window direction.

* * * * *